Aug. 15, 1972     D. A. HAASE     3,684,633
LAMINATED THERMOPLASTIC FOAM-FILM DISH
Filed Jan. 5, 1971
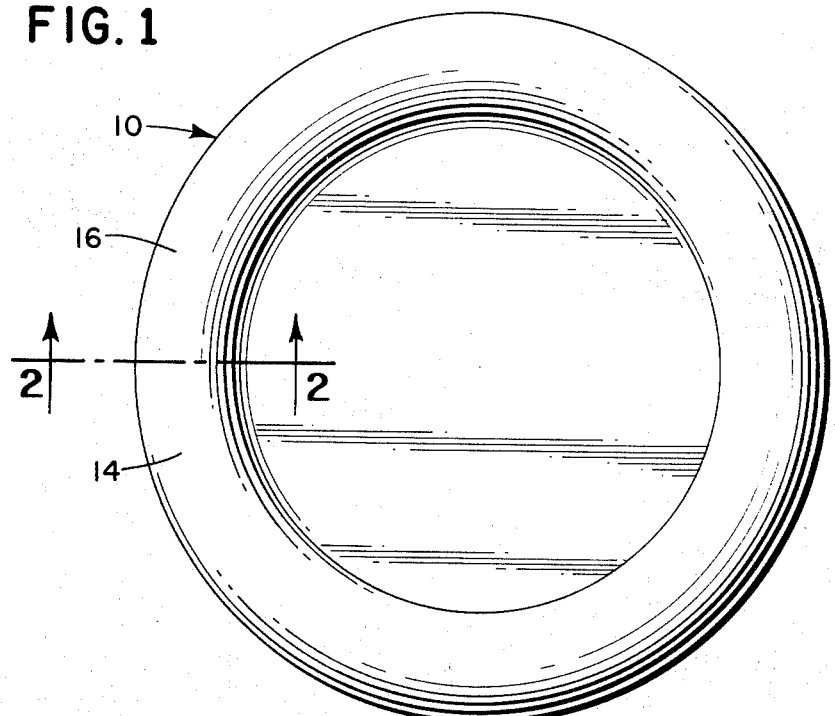
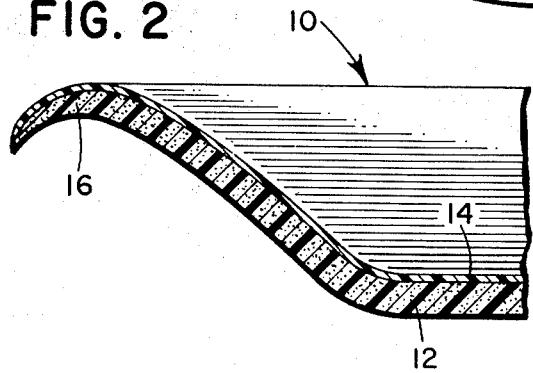
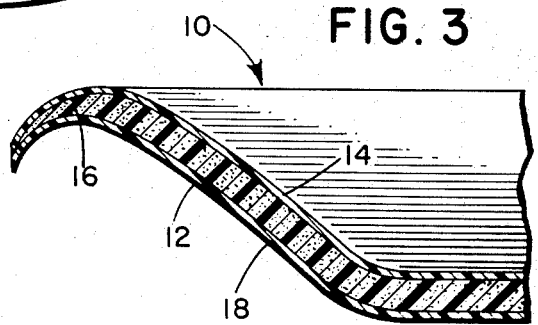
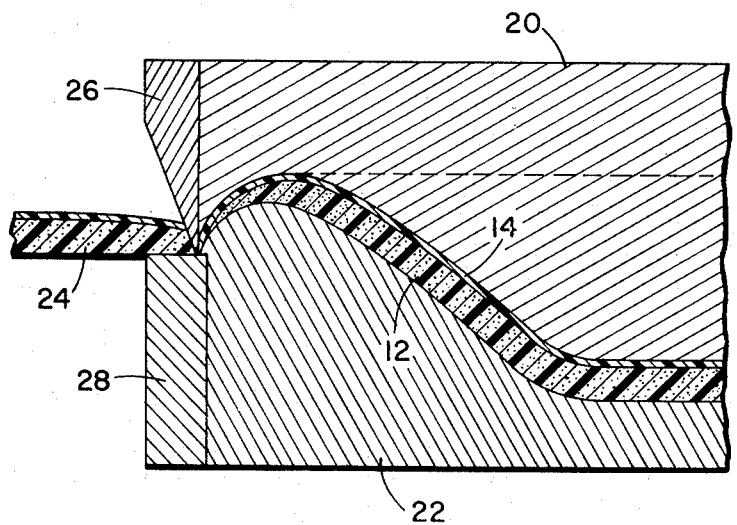
INVENTOR
DONALD A. HAASE

United States Patent Office 3,684,633
Patented Aug. 15, 1972

3,684,633
LAMINATED THERMOPLASTIC FOAM-FILM DISH
Donald A. Haase, Penfield, N.Y., assignor to Mobil Oil Corporation
Filed Jan. 5, 1971, Ser. No. 104,046
Int. Cl. B32b 1/04; B29d 27/00; B65d 25/00
U.S. Cl. 161—44                            10 Claims

ABSTRACT OF THE DISCLOSURE

A disposable plastic dish comprised of a thin lamina of oriented thermoplastic film superimposed upon a polystyrene foam lamina, the dish having an outwardly extending rim at its upper periphery, the foam of the rim being compressed to strengthen the edge of the dish and to result in the rim tapering to a thin edge at the periphery of the dish. The thin edge of the rim is substantially shielded from view from above by the superimposed thermoplastic film and the configuration of the rim.

BACKGROUND OF THE INVENTION

The present invention relates to receptacles for food for human consumption, and more particularly to laminated thermoplastic dishes, e.g., plates, bowls and saucers. The dishes of the invention are made from a thermoplastic foam insulating lamina and a thin inner reinforcing lamina of a thermoplastic film. It is also contemplated that a second reinforcing film may be provided on the other side of the foam insulating lamina.

It is well known in the prior art to employ disposable dishes made of a paper stock which may be coated or uncoated. Paper stock of this type is subject to mechanical deterioration and disintegration, particularly when the dish contains an aqueous liquid, for example if the dish has a glued seam, the seam may weaken or break. The use of coated paper is subject to the disadvantage of possible contamination of the food product by the coating material.

In view of these problems it has also been proposed to make disposable dishes of one or more layers of synthetic plastic material. Constructing such dishes solely of thermoplastic foam such as foamed polystyrene is not feasible since although the foam is a light-weight rigid material having very good insulating properties which are desirable in a product of this nature, the foam does not have sufficient structural strength unless a very thick sheet of foam is employed. A dish of relatively thick foam is undesirable from both an economic standpoint and an aesthetic standpoint. Making the dishes of relatively strong thermoplastic film is undesirable since such dishes would not have the desirable insulating properties, and it would lack rigidity unless a relatively thick film was employed.

In view of the foregoing, it has been proposed to construct dishes of a combination of a thermoplastic foam and a thermoplastic film in order to hopefully obtain a product which has the desirable characteristics of each without their shortcomings. However, known prior art laminated plastic foam-film dishes have generally not achieved good consumer acceptance.

A principal reason for negative consumer reaction has been that, in general, when thermoforming and trimming plastic foam-film laminates it is normal for the thickness of the foam in the trim area, which corresponds to the periphery of the dish, to be nearly the same thickness or gauge as the balance of the laminate. Thus the thickness of the foam at the edge of the finished dish remains substantially the same as the thickness of the remainder of the dish. While certain types of trimming operations will reduce this thickness somewhat, the finished dish will nevertheless evidence a substantial thickness at the trimmed edge. In the case of a thermoformed plastic foam-film laminate, that is, a laminate of dissimilar materials, the trimmed edge will reveal the stratified layers of materials comprising the laminate. It has been found that consumer reaction is negative to such a thick edge on thermoformed foam-plastic laminated tableware articles such as plates, bowls, saucers, etc. in view of what consumers apparently consider to be an aesthetically unattractive appearance.

SUMMARY OF THE INVENTION

It is a principal object of the present invention to provide a novel, improved thermoplastic foam-film laminated dish which is not subject to the aforementioned adverse consumer reaction exhibited towards prior art dishes of this general type, and which has good strength characteristics.

In order to accomplish the objectives of the present invention, during the course of thermoforming the laminated stock material from which the dish is made, the gauge of the thermoplastic foam at the peripheral edge of the resulting dish is substantially reduced by compressing this portion of the foam. Ideally, the thickness of the foam tapers towards the periphery to the lower limit of the gauge which would result from complete compression of the foam. In addition, the dish is formed with an outwardly extending peripheral rim so that when viewed from above the observer does not see the trimmed peripheral edge of the dish. The rim when seen in vertical cross-section preferably has an arcuate, downturned configuration.

Besides the improved appearance resulting from the above-mentioned construction, it has been found that the compression and reduction in cross-section of the foam at the rim of the dish results in a change in the physical strength properties of the foam. The ultimate elongation of polystyrene foam as measured in a standard tensile test increases as the foam is compressed to smaller gauges. Accordingly, the provision of such a compressed edge on a polystyrene foam dish such as a dinner plate results in the advantage that the dish can deflect further under load before failing. This increased resistance of the edge of the dish to cracking and the like is particularly advantageous since failure of this type of product nearly always occurs with propagation of a break which begins at the edge of the product.

A dish in accordance with the presently preferred embodiment of the present invention is comprised of a polystyrene foam lamina upon which there is heat sealed a thin lamina of biaxially oriented polystyrene film which comprises the upper surface of the dish, that is, the surface which directly contacts the food. The thickness of the film is substantially uniform throughout, and the thickness of the foam is substantially uniform throughout with the exception of the foam at the peripheral rim which is compressed into a tapering configuration to achieve the pleasing appearance and increased resistance to cracking and the like discussed previously.

BRIEF DESCRIPTION OF THE DRAWINGS

FIG. 1 is a plan view of a dish which is in accordance with the presently preferred embodiment of the invention.

FIG. 2 is a vertical sectional view taken on the line 2—2 of FIG. 1.

FIG. 3 is a view similar to FIG. 2 of another embodiment of the present invention.

FIG. 4 is a vertical cross-sectional view through one side of apparatus for thermoforming and trimming a laminated stock material to obtain the dish of FIG. 1.

DETAILED DESCRIPTION OF THE INVENTION

Referring now to the drawing, reference numeral 10 generally designates a dish constructed in accordance with the presently preferred embodiment of the invention. For purposes of illustration, the invention has been depicted as embodied in a dinner plate; but the invention is also applicable to other dishes such as saucers and bowls.

The dish 10 is constructed of an outer insulating and rigidifying lamina 12 of polystyrene film and an inner strengthening lamina 14 of an oriented thermoplastic film preferably biaxially oriented polystyrene film. The thickness of the polystyrene foam lamina 12 is relatively uniform throughout the generally horizontal base and the upwardly and outwardly sloping annular side of the plate. The dish has an arcuate downturned peripheral rim which is constituted by a peripheral edge portion 16 of the foam and by the overlying edge of the film 14.

As seen in FIG. 2, the foam edge portion 16 tapers outwardly to an edge thickness which is only a small fraction of the thickness of the foam lamina 12 constituting the remainder of the dish. The foam of edge portion 16 is compressed with the degree of compression varying inversely with the thickness, that is, the greatest amount of compression occurs at the edge of the rim portion 16.

While exact dimensions such as thickness will vary depending upon the overall size of the dish and its configuration, the thickness of the film 14 is normally 1–10 mils, preferably about 2–4 mils, and the thickness of the foam lamina 12 is preferably within the range of 60 to 110 mils. The density of the foam is normally in the range of 3 to 6 pounds per cubic foot except at the rim where the foam is compressed to about 10 to 50 and preferably 30 to 50 pounds per cubic foot. The thickness of the foam edge portion 16 is preferably within the range of 10 to 30 mils. The amount of reduction in thickness occurring in the rim portion 16 is at least 50% and preferably about 70 to 90% based on the thickness of the foam lamina 12 immediately adjacent to the edge portion 16.

In view of the relatively small thickness of the foam edge portion 16 and in view of the rim configuration, the joint between the stratified laminae 12 and 14 is relatively unnoticeable, and this is especially true when the plate is seen in plan view as would be the case when the plate is in use upon a table.

In order to improve the appearance of the dish, the foam may be colored by the addition of a suitable pigment prior to extruding the foam. This color will be visible through the transparent or translucent biaxially oriented polystyrene film 14. If desired, a suitable design may be imprinted upon the inside of the dish during or after the step of thermoforming the dish.

FIG. 3 illustrates another embodiment of the present invention which is identical to the embodiment described previously with the exception that in the FIG. 3 embodiment an additional oriented thermoplastic film, preferably a biaxially oriented polystyrene film, is provided as an outer lamina 18 on the underside of the dish.

The FIG. 3 embodiment is presently a less preferred embodiment of the invention than that of FIG. 1. Although the film lamina 18 imparts additional strength to the dish, this additional strength is normally not required in most applications. Similarly although the outer lamina 18 improves the appearance of the underside of the dish, this is normally not significant since the user is concerned primarily with the appearance of the dish in use. At this time it is the upper surface of the dish, that is, the surface covered by the film lamina 14 which is seen by the user. Accordingly, the additional expense of providing the outer lamina 18 is normally not warranted. Nevertheless, there may be occasions when the provision of the outer lamina is warranted.

The dishes of the invention are prepared from a stock material comprising a laminated web of substantially uniform thickness comprising a lamina of polystyrene foam and a lamina of thermoplastic film heat sealed to one side of the foam lamina, or in the case of the FIG. 3 embodiment there is also a lamina of thermoplastic film heat sealed to the other side of the foam lamina.

The laminated stock material is preferably prepared without the use of an adhesive by heat sealing the preformed laminae to each other. The polystyrene foam lamina may be prepared employing a standard extruder having a tubular die orifice to extrude a tube of polystyrene foam. Essentially conventional extrusion techniques may be utilized to produce the polystyrene foam, for example, the foam may be prepared by extruding polystyrene beads which have a blowing agent such as pentane incorporated therein. Alternatively, a direct injection extrusion technique may be employed whereby polystyrene resin pellets are introduced into standard extruder and, as the polystyrene is formed into a molten mass within the confines of the extruder, a blowing agent such as pentane or other normally liquid low boiling hydrocarbon is injected into the molten mass. Thereafter, the pentane-molten polystyrene mixture is extruded through a tubular die orifice. The resulting polystyrene foam tube may be drawn over a mandrel and subsequently cut longitudinally and flattened to form a flat polystyrene foam sheet. While still hot the foam sheet is heat sealed to the thermoplastic film, for example, biaxially oriented polystyrene film which has been preheated preferably to about 190° F. The heat sealing is accomplished using a heated seal roll maintained at a temperature of about 250° F. to about 350° F. preferably from about 290° to about 320° F. in order to achieve an interface temperature of 220° F. This interface temperature is effective to cause heat sealing since residual blowing agent present in the foam has a plasticizing or softening effect upon the foam so that the lamination may be carried out at temperatures lower than that conventionally utilized in the heat sealing of such materials. Usually the laminated stock material is allowed to age, for about one to two days prior to thermoforming, but in some installations the thermoforming may be carried out directly following the laminating step.

FIG. 4 illustrates the basic apparatus used for both molding and cutting the stock material into a dish. For purposes of illustration, the dish shown is a dinner plate constructed in accordance with the embodiment of FIG. 1. The plate is produced from the preheated stock materil having an upper thermoplastic film lamina 14 and a lower foam lamina 12, each lamina being initially of substantially uniform thickness throughout. The apparatus includes complementarily shaped male and female mold parts 20 and 22. As is clearly shown in FIG. 4, the configuration of the mold parts is such that the compressed rim portion 16 is obtained by compression of the foam in this region. It will of course be appreciated that the stock material may be of such size that a plurality of molds may act upon the stock material at the same time in order to simultaneously produce a plurality of dishes. At the conclusion of the thermoforming operation, the excess or scrap portion of the stock material indicated by reference numeral 24 is cut off by a forged knife 26 which compresses the foam and shears it against a cutting anvil 28. Preferably the knife 26 is heated to a temperature which may be as high as about 250° F. While this is helpful to achieving the desired thin edge of the final product, it is not essential. The dish is then removed from the mold in conventional manner.

EXAMPLE

A 9 inch diameter dinner plate was prepared from a laminated stock material comprising a lamina of 3.0 gms./36 square inch basis weight polystyrene foam containing pentane as a blowing agent, and an upper lamina of 3.0 mil printed biaxially oriented polystyrene. The stock material was thermoformed using a Thermotrol Model 460 thermoformer employing a former cycle of 3.5 seconds.

This apparatus includes matched aluminum molds, and the scrap stock material was cut off employing a trim-in-place technique. The mold was preheated to 105° F. and the stock material was also preheated to about 220–230° F. which preheating caused an increase in the thickness of the foam. The finished plate, which exhibited a small amount of spring back of the foam when the molding pressure was removed, had a thickness of 0.090 inch and a foam density of 3.7 pounds per cubic foot throughout except in the compressed rim portion. The thickness at the outer edge of the rim was 0.011 inch, and the density of the rim increased progressively to the outer edge at which the density was 40 pounds per cubic foot. It has been found that plates produced by this procedure are preferred by consumers as compared to thick edge products, and the plates also exhibit improved tear and breakage resistance due to the compressed foam rim.

It will be appreciated that other dishes such as saucers and bowls are produced similarly using appropriately contoured molds.

While presently preferred embodiments of the invention have been shown and described with particularity, it will be recognized that various changes and modifications may readily suggest themselves to those of ordinary skill in the art upon being apprised of the present invention. For example, considerable variation may be made in the size and configuration of the dishes. Also, various other forming procedures may be utilized to produce the dishes including trimming the dish from the remaining stock material by a post trimming operation or post thermoforming the rim after thermoforming the dish. It is intended to encompass all such changes and modifications as fall within the scope and spirit of the appended claims.

What is claimed is:

1. A laminated plastic dish having a base and an upwardly extending annular side portion comprised of an oriented thermoplastic film lamina superimposed upon a thermoplastic foam lamina the side portion having an integral outer peripheral rim, the density of the foam of the rim being at least 50% greater than the density of the remainder of the foam, and said rim tapering outwardly to a thin edge.

2. A dish according to claim 1, wherein the density of the foam of the base and the side portion is about 3 to 6 pounds per cubic foot, and wherein the density of the foam at said rim progressively increases to a maximum of about 10 to 50 pounds per cubic foot.

3. A dish according to claim 2, wherein the amount of reduction in thickness of the foam at said rim progressively increases to a maximum of about 70 to 90% based on the thickness of the remainder of the foam.

4. A dish according to claim 1, wherein said rim is downturned so that a stratified edge at the juncture of said film lamina and said foam lamina is normally not seen when the dish is viewed from above.

5. A dish according to claim 1, wherein said rim has an arcuate downturned configuration.

6. A dish according to claim 1, wherein the dish is a generally circular dinner plate.

7. A dish according to claim 1, wherein the side of the foam lamina away from the film lamina is uncovered.

8. A dish according to claim 1, further comprising an additional thermoplastic film lamina sealed to the underside of the foam lamina.

9. A dish according to claim 1, wherein said foam is polystyrene foam.

10. A dish according to claim 9, wherein said film is biaxially oriented polystyrene film.

References Cited
UNITED STATES PATENTS

| | | | |
|---|---|---|---|
| 3,164,655 | 1/1965 | Howard et al. | 264—321 |
| 3,335,892 | 8/1967 | Hildreth | 264—321 XR |
| 3,012,283 | 12/1961 | Foster | 264—321 XR |

PHILIP DIER, Primary Examiner

U.S. Cl. X.R.

161—118, 149, 160, 161; 220—9, 23.6, 74; 229—2.5; 264—163, 321